Patented July 10, 1934

UNITED STATES PATENT OFFICE 1,966,408

1,966,408

BONDED ARTICLE AND METHOD OF BONDING THE SAME

Earl Leeson Hauman, St. Catharines, Ontario, Canada, assignor to The Exolon Company, Blasdell, N. Y., a corporation of Massachusetts No Drawing. Application March 17, 1932, Serial No. 599,600

17 Claims. (Cl. 106—9)

In my prior applications Serial No. 311,262 and Serial No. 599,599 I disclosed a novel aluminous oxide product resulting from the fusion and cooling of an alumina silica mix which should give mullite in preponderance to corundum but which when modified by the addition of a counterbalancing agent which counterbalances the cooling characteristic of the furnace, thus extending the period of corundum crystal growth and shortening or eliminating entirely the later period of mullite development, forms a product of entirely new characteristics. Such product consists of a glassy matrix containing alpha corundum crystals of such relatively large and freely developed type as to constitute an entirely new variety of alpha corundum and for which I have coined the name "euhedral" corundum. These crystals constitute a preponderance of the mass and were developed in a glassy matrix of sufficient amount to have caused their free growth with little or no mullite formation.

My present invention utilizes the product of said prior applications.

The usual fused alumina oxide abrasive or refractory grain has always been bonded by the addition of some separate and independent bonding agent when fabricated into some useful article of commerce, as for example, an abrasive wheel, a refractory brick, or a ceramic tile. The bonds most frequently used are the well-known ceramic bonds, as clay, flint, feldspar or the like, although sodium silicate, rubber and bakelite have also been used, particularly in abrasive practice.

The matter of securing a good union between the bond and the grain has presented various difficulties and inasmuch as the effectiveness of the grains, whether used for abrasive or refractory purposes, is directly dependent upon the efficiency of such union, various types of bond and various methods of bonding have been proposed.

The function of the ceramic bond is to effect a mechanical union between contacting surfaces of the grains due to the partial liquefication of the bond itself in the firing process. This mechanical union is either aided or retarded by the ability of the grain to be wetted by the bond or to have the bond readily flow over the individual surfaces of the grain thereby assuring a good mechanical contact. There may also be a reaction between the bond and the surface of the grain resulting in some development of mullite. This bond has always been an extraneous and independent medium, as the fused aluminum oxide grains carry no or practically no bond substances.

As previously indicated my novel corundum product exists as a fused and cooled mass consisting of alpha corundum crystals which as an inherent characteristic of their process of formation are dispersed in a glassy matrix, the crystals constituting a preponderance of the mass and the glassy matrix existing in sufficient quantity to have permitted the free growth of such crystals.

Petrographic analysis of my novel product shows that such mass is a ground mass in which are embedded well developed transparent crystals showing no definite orientation. These crystals are optically identified with the irregular corundum grain familiar in the art, the striking difference being that they are well crystallized, or euhedral in form. These crystals are platy or tabular in habit, being elongated parallel to the basal direction, and frequently show hexagonal outlines. These platy crystals are truncated with rhombohedral faces, and in thin section may show a trapezoidal cross section. They present optical properties checking exactly with those of alpha corundum, namely, they give an uni-axial interference figure, the optical character is negative, and the index of refraction is above 1.74. The surface of the crystals is uncorroded, showing no evidence of attack by the glass while in the molten state.

The ground mass, or interstitial material in which the crystals occur, consists of a smooth dull black substance resembling flint or chert in appearance. It consists of an unstable glass, filled with microscopic inclusions. It is identified optically as a glass because it is isotropic, that is although transmitting ordinary light, between crossed nicols it is absolutely opaque, which shows that its optical properties are the same in all directions.

The greater part of the inclusions in this glass consist of extremely small needle-like crystals, identified as mullite.

The glass, together with the inclusions has a composition high in alumina and silica, and is in striking contrast to the slags or clear siliceous glassy matrices familiar in the art of preparing crystalline corundum of the ordinary type, or in producing artificial mullite with its accompanying siliceous glass and incidental corundum.

Mullite crystals of a prismatic type are occasionally embedded between the plates of the corundum crystals in a thin layer of glass, but constitute an insignificant part of the whole.

When such mass is crushed into grain sizes the grain is already in contact with and wetted by the glassy matrix and there is already present a surface reaction product in the nature of tiny needles of mullite, due to the fact that the mass was originally in a molten state and these mullite inclusions were developed in the cooling of the mass. This insures a fully developed mechanical contact of grain and bond so that under subsequent firing conditions at ordinary bonding temperatures, there is a further development of mullite around these original mullite inclusions as nuclei. This gives to the article so bonded remarkable mechanical strength and cohesion.

Before firing at such ordinary bonding temperatures the glass analyzes as an unstable glass containing the residual alumina, silica and furnace balancing agent and such metallic oxide impurities as may be present in the mix. In a typical mix such residual constituents existed in approximately the proportions of 30% alumina, 50% silica, and 10% balancing agent, the remainder being impurities.

Such unstable glass becomes stable on firing at ordinary bonding temperatures and when fired forms the small mullite crystals heretofore described around the original mullite inclusions, as well as a siliceous glass. This makes it unnecessary to separately add a ceramic or other independent bond when using the crushed or granulated mass, consisting either of the crushed glass alone as a bond for its own corundum grain, or when using the crushed mass of glassy matrix and alpha euhedral corundum crystals, incorporated with an inert refractory or abrasive grain.

Unlike ordinary fused aluminum oxide grain which is characterized by a deficiency of matrix, the matrix seldom exceeding 6% of the mass of crystals and matrix my novel product is high in matrix or bonding agent, the matrix ranging as high as 20% of the mass.

The ultimate article fabricated from such novel product is therefore not only well bonded but has abrasive and refractory properties not present where the usual artificial corundum or fused aluminum oxide is used as a base material. With such ordinary fused aluminum oxide grains the grains exist in such an imperfect state of crystallinity as to be of haphazard formation and hence not to afford that quantity so essential in an abrasive or non-slip tread surface, as a grinding wheel or a non-slip tile for example, namely, that of constantly presenting new cutting edges by minute fraction in the course of wear or use of the article.

In other words, with the ordinary fused aluminum oxide grain there was no perfection of growth of the crystal structure and this crystal structure hence was not platy or tabular in development or euhedral in form but instead was minute and haphazard as to formation, being merely crystalline without definite crystal structure. The crystallus material was developed in a glassy matrix of such small amount, sometimes as almost to be non-existent, that the matrix itself was of no value as a bond in fabricating the ultimate article formed from such crystalline material.

More than this, the fused aluminum oxide contained impurities of such nature and in such degree as to make impossible any selective coloration thereof when fabricated into an abrasive wheel, ceramic tile, or the like. These inherent impurities result in a discoloration of the article itself so that instead of affording a white or colorless base or blank which may be tinted to any desired hue the base or blank was incapable of distinctive coloration. Where it has been attempted to obtain a white or blank base by using highly pure fused aluminum oxide the resultant product was characterized by an absence of any interstitial slag formation, being perforate of structure and hence highly crumbly so that it required a highly vitrified bond and a substantial amount of such vitrified bond to prevent the early destruction of the ultimate article fabricated from such highly pure grits.

As described in my said pending application above referred to I produce the mass consisting of a glassy matrix containing a preponderance of alpha corundum crystals of freely and fully developed type from an alumina silica melt consisting roughly of three parts alumina to one part silica. Before or during fusion of this mix I add a relatively small quantity of an alkali or an alkaline earth oxide or a combination thereof to provide a balancing or reactive influence against the cooling effects existing in the process of solidifying the melt in the electric furnace. Such agent may be any of the alkaline earth oxides, as the oxides of beryllium, magnesium, calcium, barium, and strontium, or it may be any of the oxides of the alkali metals such as potassium, sodium, lithium, rubidium, and cesium, or any combination of these two oxide groups.

The selection of the balancing agent depends upon the characteristics wanted in the ultimate glass. If a glass of high melting point is wanted, one or more members of the alkaline earth group will be used. If a glass of low melting point is wanted, one or more members of the alkali group will be used. If a glass having a melting point between these high and low melting points is wanted, one or more members of the alkaline earth oxide group may be combined with one or more members of the alkali group.

In any event it is of the utmost importance that the counterbalancing agent used shall prevent the absorption of the alumina, forming the aluminum silicate, and that the residual glassy matrix shall exist in sufficient amount to have provided for the free growth of the corundum crystals to the practical exclusion of the mullite.

Starting with an alumina silica melt which is in the range of alumina silica established as mullite forming, I am able, therefore, by the simple addition of the relatively small amount of balancing agent to cause the temperature of formation of the mullite to fall off sharply thus increasing the time for corundum crystal growth and decreasing the later reactive period wherein attack on the corundum crystal by the liquid normally occurs.

The steel shell, water-cooled furnace is particularly adapted for the practice of my process because the cooling characteristics of the shell can be balanced by the addition of the absorption-preventing agent in suitable amounts to cause the practical exclusion of mullite growth in the melt.

I have found that the addition of the alkali and/or alkaline earth oxide to the melt might be lowered with similar results in a furnace of small dimensions. For instance 2½% counterbalancing agent in a mass of 1000 pounds is sufficient, whereas a melt approaching 8000 pounds needs 5% counterbalancing agent for similar results, as to crystallization of the corundum.

Although proportions may vary largely according to the particular characteristics wanted in the ultimate product the following analyses are typical of the products obtained by my method:—

|  | A | B | C |
|---|---|---|---|
| Glassy matrix | 25 | 26.5 | 28 |
| Euhedral corundum | 75 | 68.5 | 62 |
| Mullite | 00 | 5 | 10 |
|  | 100 | 100 | 100 |

Any of the foregoing products may be obtained from the same mix by varying the furnace size, or assuming that they are all to be fused in the same furnace, the several products could be obtained by varying either the alumina-silica ratio or the percentage of the added absorption prevention agent.

As a matter of fact the mullite might be present in even greater amount, say up to 15%, than the amount indicated in table C and still give a product which is commercially useful. Similarly the ratio of glassy matrix to alpha corundum might be varied beyond the limits given in the foregoing tables. I have obtained commercially useful products in which the corundum limits were between 60% and 75%, and the glassy matrix between 20% and 30%, the only requirement being that there shall be enough glassy matrix to promote the free growth of the corundum crystals to the substantial exclusion of the mullite, meaning thereby that the later period of mullite formation shall be either so shortened that the mullite will be present in relatively inconsiderable quantity, or entirely eliminated. Experience would indicate that anything under 20% of glassy matrix is an insufficient amount of glassy matrix to permit the free growth of the corundum crystal and I therefore set 20% as my lower limit for the glassy matrix.

As to the preponderance of corundum over mullite this depends upon the particular use to which the final product is to be put and in any event means a product in which the corundum crsytals constitute more than half of the mass of corundum crystals, mullite and glassy matrix.

In practicing my invention, I select the grain on the basis of the ratio of crystal to glassy matrix, this control being effected by means of electrostatic separation or any other well known means of classifying. By varying the proportions of glassy matrix to crystal the abrasive or refractory value of the ultimate article may be controlled according to the particular properties wanted in the particular article being fabricated.

In a characteristic batch for an abrasive wheel or the like, such ratio might be 75% crystals to 25% glassy matrix. The crystals and their glassy matrix are pressed and baked to ultimate article form and in such action the glassy matrix is partially liquefied and becomes a surrounding medium or envelope which of itself bonds the crystals together. As a modification of the above, I may wish to alter the firing range of the glassy matrix by the addition of small quantities of metal oxides of an earthy nature, such as tin oxide, borax and the like. For instance, this amount may be as low as one per cent of the batch.

In the forming of the ware, I may add a small percentage of the temporary bond or plasticizer to facilitate the operation.

If any special property due to high bond content is desired, I may add a separation product in which the glassy matrix predominates.

Similarly I may add ceramic coloring agents, for it is a characteristic of the articles made from my product that they are normally relatively light colored or white and hence may be colored in any desired hue.

In a characteristic batch for a safety tread such ratio might be 80% crystals to 20% glassy matrix.

The mass of crystal and original matrix may be ground to pass any desired mesh size usually in the scale of mesh sizes between 40 and 80. This material may be subjected to magnetic treatment for the removal of iron contamination. Electro-static separation on the granular material may also be employed to increase or decrease the ratio of alumina crystals to the glassy matrix. If desired, a temporary bond may be introduced with sufficient moisture to produce a good pressing consistency. The batch, with or without temporary bond, may be baked into the desired article, as for example, a tile, in any kiln, as an oil kiln, under oxidizing conditions for a sufficient length of time and at a sufficient temperature to produce an article having the desired density and hardness. In practice, I obtain good results by baking for approximately ten hours at oxidizing temperatures, the final or maximum temperature approximating 2500° F.

The resultant article is a base or blank which is practically snow white and hence may be colored by any of the usual color processes well known in the ceramic field. For example, it may be colored by simply mixing with the dry material various metallic oxides in small percentages, the selection of these oxides and the percentages thereof being according to the desired color effect wanted.

My tile is characterized by its simplicity of formation and by its effectiveness as regards wearing and non-slipping qualities. Structurally, my tile is an article of high tensile strength and density and impermeability.

The foregoing examples are illustrative and in no way limiting. In general it may be said that where an article which is not highly abrasive, as for example a non-slip tile is wanted, the separation product shall be a product high in glassy matrix and low in alumina crystal.

Such an article is made in part from a finer ground (100 mesh or finer) separation product wherein the glassy matrix is approximately 70 parts glass to 30 parts alumina crystals. Of this fine separation product I use approximately from 31½ to 33½%. To this I add a coarser ground (60 to 80 mesh and finer) separation product in which the ratio of the glass to alumina crystal is approximately equal parts of this coarser separation product. I use approximately from 50.5 to 52.5%.

These fine and coarse separation products in approximately the percentages given are mixed together and produce a mixture of glass and alumina crystal in which the ratio of crystal to glass is approximately 60% crystal to 40% glass.

To the above mixture I add a flux, approximately 10% to 14% composed of hydrated lime, litharge, potassium, permanganate, talc, or lepdolite, in any desired proportions together with approximately 2.5 to 8% of metallic oxides to develop a white or colored impervious yet non-slip body when fired at ordinary ceramic bonding temperatures.

When a highly abrasive article as a wheel is wanted, the separation product may be a product high in alumina crystal and low in matrix and usually contains a higher crystalline alumina content than the original mass. As an instance of such a highly abrasive article I use a ground preparation product in which the ratio of alumina crystal to glass is 80 to 90% crystal to 20 to 10% glass. Depending on the type of article desired, such separation product is crushed and graded to definite screen limits. In a typical example the product is ground to pass through a 50 mesh screen and be retained on a 100 mesh, the coarse mesh in this screening predominating.

Of this split I use approximately 80% and 20% of a flux composed of kaolin, litharge, talc, feldspar or lepidolite in such proportions as when fired at ordinary ceramic bonding temperature to produce an article having the desired abrasive qualities.

Where an alumina refractory is wanted the percentage of alumina crystal to glassy matrix in the separation product may run as high as 90% alumina to 10% glass.

This product is approximately 16 mesh and finer. Of this I take approximately 92% and add to it a flux, approximately 8%, composed of plastic clay, talc, feldspar, or lepidolite in such proportions as to produce when fired at ordinary ceramic bonding temperatures an article, as a fire brick, having the desired refractory qualities.

Where lepidolite is used as a flux it appears to have the dual action not only of causing the glass to flow more readily around the fragments of the corundum crystal with which the glass is already in perfect contact but it also appears to act as a crystallizer for the minute inclusions of mullite in the glass when the product is fired at ordinary bonding temperatures. Where the term "consisting of" is used in the claims to describe my novel bonded article, such term does not exclude the idea that the article may have been treated with some coloring oxide. Where the term "stable" is used to describe the glass, such term is used to mean a glass which on re-heating or remelting and subsequent cooling becomes again the same glass which was so re-heated or remelted.

What I therefore claim and desire to secure by Letters Patent is:—

1. As a bond for bonding the relatively large, well-defined freely developed alpha corundum crystals which were developed in situ in it, a ground portion of the unstable glass in which a preponderance of such crystals were developed as a matrix, said glass being present in sufficient amount to have provided for the free growth of the corundum crystals, and the mass of glass and crystals resulting from the fusion and cooling of a mix consisting of from 60 to 86 parts of alumina to from 40 to 14 parts of silica together with an absorption-prevention oxide of the group composed of alkaline earth and alkali metal oxides in sufficient amount to extend the period of corundum crystallization during cooling of the melt and to shorten or eliminate the later period of mullite development, said glassy matrix having the property of forming mullite and a stable clear glass on heating to ordinary bonding temperatures, and consisting of the residual alumina, silica and absorption-prevention oxide which constituted said mix and being rich in alumina.

2. A bond as claimed in claim 1, wherein the absorption prevention agent is an oxide of an alkali metal.

3. A bond as claimed in claim 1, wherein the absorption prevention agent is an alkaline earth oxide.

4. A bond as claimed in claim 1, wherein the absorption prevention agent includes both an oxide of an alkali metal and an alkaline earth oxide.

5. As a bond for bonding inert refractory or abrasive grains, a ground mass consisting of an unstable glass and a preponderance of alpha corundum crystals developed in situ in such glass as a matrix, said crystals being relatively large, well-defined and freely developed, and said glass being present in sufficient amount to have provided for the free growth of the corundum crystals and having the property of forming mullite and a clear stable glass on heating to ordinary bonding temperatures, said ground mass resulting from the fusion and cooling of a mix consisting of from 60 to 80 parts of alumina to from 40 to 14 parts of silica together with an absorption-prevention oxide of the group composed of alkaline earth and alkali metal oxides in sufficient amount to extend the period of corundum crystallization during cooling of the melt and shorten or eliminate the later period of mullite development, said glass consisting of the residual alumina, silica and absorption-prevention oxide which constituted said mix and being rich in alumina.

6. A bond as claimed in claim 5, wherein the absorption prevention agent is an oxide of an alkali metal.

7. A bond as claimed in claim 5, wherein the absorption prevention agent is an alkaline earth oxide.

8. A bond as claimed in claim 5, wherein the absorption prevention agent includes both an oxide of an alkali metal and an alkaline earth oxide.

9. A bond as claimed in claim 5, wherein the glassy matrix constitutes approximately 20% of the original mass of glassy matrix and corundum.

10. A bonded article of abrasive character consisting of a crushed separation product which is high in glassy matrix and low in alumina crystal, said separation product consisting of freely developed alpha corundum and the unstable glass in which such crystals were developed in situ as a matrix, said glass being present in sufficient amount to have provided for the free growth of the corundum crystals and having the property of forming mullite and a stable clear glass on heating to ordinary bonding temperatures and said separation product being derived from an alumina silica mix consisting of from 60 to 80 parts of alumina to from 40 to 14 parts of silica, together with an absorption prevention oxide of the group composed of alkaline earth and alkali metal oxides in sufficient amount to extend the period of corundum crystallization during cooling of the melt and to shorten or eliminate the later period of mullite development.

11. A bonded article of highly abrasive character, consisting of a crushed separation product which is high in alumina crystal content and low in glassy matrix, said separation product consisting of freely developed alpha corundum and the unstable glass in which such crystals were developed in situ as a matrix, said glass being present in sufficient amount to have provided for the free growth of the corundum crystals and having the property of forming mullite and a stable clear glass on heating to ordinary bonding temperatures and said separation product being derived from an alumina silica mix consisting of from 60 to 80 parts of alumina to from 40 to 14 parts of silica, together with an absorption prevention oxide of the group composed of alkaline earth and alkali metal oxides in sufficient amount to extend the period of corundum crystallization during cooling of the melt and to shorten or eliminate the later period of mullite development.

12. In the art of bonding articles, the method which consists in incorporating with the grain to be bonded a portion of the ground mass consisting of freely developed alpha corundum crystals and the unstable glass in which such crystals were developed in situ as a matrix, said glass being capable of developing mullite and a stable glass on heating, and in firing the mixture to a temperature and under conditions which alter the matrix glass from an unstable glass to a stable glass consisting of mullite crystals and a clear glass bond.

13. In the method as claimed in claim 8, the further step of adding to said mixture before heating a flux which assists the crystallizing action of the mullite when the mixture is fired.

14. A bonded article as claimed in claim 16, wherein the separation product is a mixture consisting of approximately one-third of a fine ground separation product having a glass to alumina ratio of approximately 3 to 1 and approximately one-half of a coarse ground separation product having a glass to alumina ratio of approximately 1 to 1.

15. A bonded article as claimed in claim 11, wherein the separation product has an alumina crystal to glassy matrix ratio of approximately 80 to 90% crystal to 20 to 10% glass.

16. The process which comprises incorporating an inert refractory grain with a binding agent consisting of an unstable glass containing approximately 30% alumina, 50% silica, and 10% absorption prevention oxide of the group composed of alkaline earth and alkali metal oxides and capable of forming crystals and a siliceous glass on heating, and then firing such mass at a sufficient temperature and for a sufficient time to develop mullite in the bond.

17. The process as claimed in claim 16, in which the refractory grain is alpha corundum containing freely developed crystals.

EARL LEESON HAUMAN.